UNITED STATES PATENT OFFICE.

STEPHEN L. GOODALE, OF SACO, MAINE.

IMPROVEMENT IN PROCESSES OF TREATING FISH-SCRAP.

Specification forming part of Letters Patent No. 186,204, dated January 16, 1877; application filed July 24, 1876.

*To all whom it may concern:*

Be it known that I, STEPHEN L. GOODALE, of the city of Saco, county of York, and State of Maine, have invented a new and useful Process for Increasing the Product of Oil and Improving the Quality of Scrap from Fish, which process is fully set forth in the following specification:

It is well known to those engaged in the business of rendering fish—such as menhaden and herrings—for the purpose of obtaining oil and scrap therefrom, that the ready drying of the latter is an object of great importance, because drying insures preservation by preventing decomposition, and also because it diminishes cost of transportation by causing material reduction of its weight. It is also well known that the drying of fish-scrap, as ordinarily produced, is attended with serious difficulties, both by reason of the retention in it of a considerable quantity of oil which cannot be removed by pressure, and also by the presence of a gelatinous or gluey substance, probably produced from the animal tissues during the cooking, which has the effect, when drying is attempted, of forming a crust or coating over the masses—larger or smaller—into which the scrap may be broken, which crust or coating greatly retards uniform desiccation by protecting from evaporation the moist substance inclosed within.

The process of rendering hitherto employed is substantially as follows: The fish are first cooked sufficiently to coagulate the albumen, usually by steam, and water having been added to the fish, after which cooking the oil and watery liquid are separated as fully as practicable by draining and pressing from the more solid matter, which constitutes the scrap.

My invention consists in treating the fish after cooking, or after cooking and draining, or, preferably, after cooking, draining, and pressing once, with an additional amount of water sufficient to secure an effective washing of the more solid portions before finally pressing the scrap, which washing is assisted by agitation in any convenient manner. This treatment with water accomplishes a double benefit, namely, the liberation of an additional quantity of oil from its entanglements in the animal tissues, so that it is easily obtainable by draining and pressing in the usual way, and at the same time the above-mentioned gelatinous or gluey matter is so dissolved or diluted that it mostly passes away in the watery liquid, whereby the subsequent drying of the scrap is greatly facilitated.

In the above-named washing it is better if the water be hot, and the operation quickly completed, but any protracted heating or digestion in connection therewith is undesirable and to be avoided. As soon as the washing is sufficient, draining and final pressure should be resorted to.

I am aware that, to a limited extent, a second pressing of the scrap has been practiced, but never preceded by the treatment with water above described subsequent to cooking, in which my invention consists.

What I claim is—

The process of washing fish or fish-scrap with water subsequent to its being cooked and before it is finally pressed, whereby gelatine is removed, the yield of oil increased, and subsequent drying of the scrap facilitated.

STEPHEN L. GOODALE.

Witnesses:
EDWARD P. BURNHAM,
CHAS. M. MILLIKEN.